United States Patent [19]

Eiwen

[11] 4,010,991
[45] Mar. 8, 1977

[54] METHOD FOR DEVACUATING A VACUUM TUBE

[75] Inventor: George Ernest Eiwen, Lancaster, Pa.
[73] Assignee: RCA Corporation, New York, N.Y.
[22] Filed: Feb. 4, 1974
[21] Appl. No.: 439,561
[52] U.S. Cl. .................................................. 316/2
[51] Int. Cl.² .......................................... H01J 9/50
[58] Field of Search ................................ 316/2, 28

[56] References Cited

UNITED STATES PATENTS 2,859,324  11/1958  Belott et al. ................. 316/28 X
3,063,777  11/1962  Trax ............................... 316/2

OTHER PUBLICATIONS

Meyershofer, Machining with the Carbon Dioxide Laser, RCA Engineer 15, 1970, pp. 52–57.

RCA Technical Note, No. 384, Method of Piercing Glass Tubing, June 1960.

Primary Examiner—Roy Lake
Attorney, Agent, or Firm—G. H. Bruestle; L. Greenspan

[57] ABSTRACT

In a method for devacuating a vacuum tube to atmospheric pressure, a pulsed beam of radiant energy, such as a laser beam, is directed upon an area of the glass neck portion of the tube that is opposite and closely spaced from a surface structure of the mount assembly in the tube, so that volatilized material that is swept into the tube condenses on and sticks to the surface structure.

1 Claim, 4 Drawing Figures

METHOD FOR DEVACUATING A VACUUM TUBE

BACKGROUND OF THE INVENTION

This invention relates to a novel method for filling or devacuating an evacuated electron tube with gas to atmospheric pressure. The invention relates particularly, but not exclusively, to a novel method for opening a cathode-ray tube to air at atmospheric pressure so that the tube may be regunned.

Some prior methods for opening a vacuum tube to air employ some technique for controllably cracking the neck or exhaust tubulation, as for example in U.S. Pat. Nos. 3,063,777 to A. M. Trax, 3,404,933 to R. J. Weideman, and 3,679,284 to E. S. Thall. In *RCA Engineer*, 15, 52–57 (1970), an article by D. Meyerhofer discloses how to open a cathode-ray tube to air by puncturing a small hole in a glass wall of the tube envelope with 15 long pulses of 3 joule energy of a laser beam. While each of these prior processes seeks to minimize the amount of loose particles generated by the process, nevertheless, loose glass particles are generated by the processes, which particles are swept into that portion of the tube which is to be salvaged and reused. Where the tube opening is achieved by cracking, the particles are largely generated when the glass is fractured. Where a laser beam punctures a hole in a glass wall by the prior method, particles are generated by fracturing and also when volatilized glass material is swept into the tube envelope and condenses therein.

SUMMARY OF THE INVENTION

In the novel method, a pulsed beam of radiant energy is directed upon an area of the neck portion of the tube that is opposite and closely spaced from a surface structure of the mount assembly in the tube. The surface structure is at least 250 mils in its smallest dimension and is no further than 250 mils from the inner surface of the neck portion. When the neck wall is punctured, volatilized material that is swept into the tube condenses on and sticks to the surface structure. Thereby, fewer loose particles are generated and, subsequently, that portion of the neck containing the puncture and the mount assembly including the condensed material is cut off and discarded as scrap.

In the preferred embodiments, pulses of 1.2 to 2.2 joules are employed. For the usual wall thickness of about 90 mils, 40 to 50 pulses applied in about 30 second are adequate to puncture the wall. This lower energy concentration produces less fracturing adjacent the puncture. Also, a lesser amount of volatilized glass material is swept into the tube. Both of these features further reduce the amount of loose particles which are generated.

DESCRIPTION OF THE PREFERRED EMBODIMENTS

Figure 1:
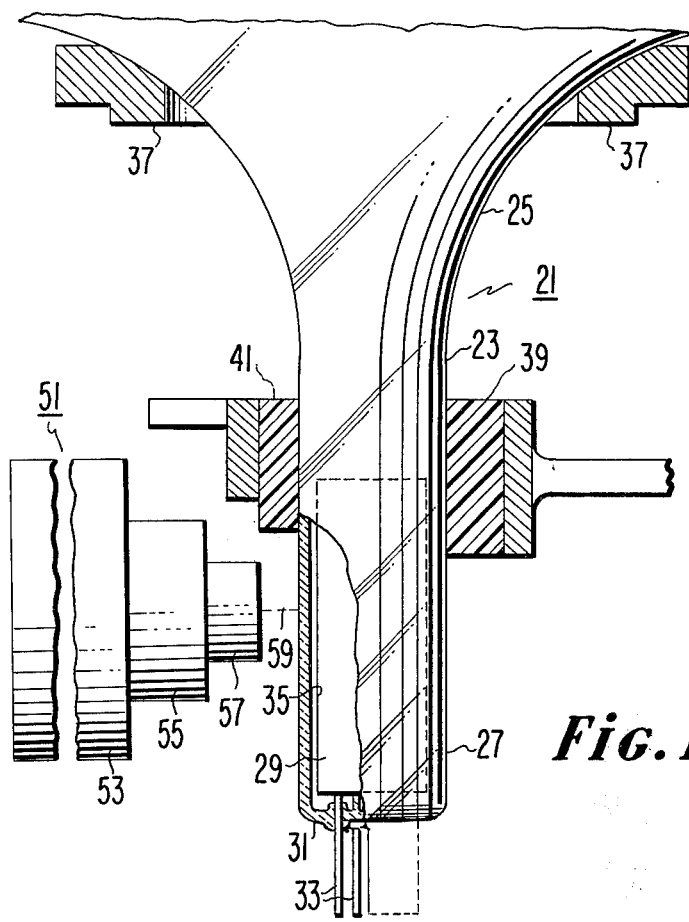
FIG. 1 is a partially-broken-away, sectional, elevational view of a laser-beam apparatus in position to devacuate a cathode-ray tube according to the invention.

FIG. 1 shows an evacuated cathode-ray tube 21 comprised of an envelope 23 having a funnel portion 25 and a glass neck portion 27, which is generally about one to two inches in diameter. The neck portion 27 houses a mount assembly 29 which is mounted on a glass stem 31 having metal stem leads 33 which extend into and support the mount assembly 29. The mount assembly 29 may include the structures of the electron gun or guns for producing an electron beam or beams, and the various grids and other structures for shaping and directing the electron beam or beams. These structures are principally of metal and include surface structures which are at least 250 mils in their smallest dimension and which are closely spaced (about 20 to 100 mils) from the inner surface of the neck portion 27 of the envelope 23. One such surface structure 35 is shown adjacent the neck portion 27 in FIGS. 2 to 4. The weight of the tube 21 is carried on the funnel portion 25 by a C-shaped yoke holder 37. The neck portion is held in position by a plastic-faced clamp comprised of a V-shaped jaw 39 and a flat jaw 41.

A radiant-energy beam-producing apparatus 51 includes a radiant-energy beam-generating source (not shown) in a source housing 53, a water-cooled lens (not shown) in a lens housing 55 and a chamber 57 for keeping the lens surface clear of dust and other absorbing material by means of circulating air or other gas. The beam, shown by the dotted line 59, carries pulses of radiant energy (preferably infrared energy) of high energy concentration. Since radiant-energy beam-producing apparatuses are described in detail in the prior art, a detailed description here is not necessary.

In this example, the radiant-energy beam-generating source is a carbon-dioxide laser tube which can generate about 50 watts of continuous radiant energy with a wavelength of about 10.6 microns. Such wavelength is almost completely absorbed by the glass wall (which is about 90 mils thick) of the neck portion 27. One suitable carbon dioxide laser apparatus is described in U.S. Pat. No. 3,745,482 to C. K. N. Patel. A preferred apparatus is carbon dioxide laser Model 42 marketed by Coherent Radiation, Palo Alto, Calif. Other beam-generating sources of radiant energy that is substantially absorbed by the glass may be used. The beam may be of other power levels and at other wavelengths. For example, the beam-generating apparatus may be a yttrium aluminum garnet laser which emits radiant energy with a wavelength of about 1.06 microns.

The radiant-energy beam-producing apparatus includes a means for producing pulses of radiant energy of controlled energy content, duration, and time separation. This may be a mechanical chopper Q-switch or a rotating mirror Q-switch. The preferred pulse-producing means is an electronic system within the beam-producing apparatus for turning the beam on and off to produce the desired pulses. The pulses preferably carry 1.2 to 2.2 joules of energy. The pulse length is designed to cause puncturing of a glass wall about 90 mils thick with 40 to 50 pulses in about 30 seconds.

The lens is used to focus the beam to a desired size on the neck portion 27 of the tube. With the preferred carbon dioxide laser a 2.5 inch *f*. 1. germanium lens can be used to focus the beam down to about 10 mils diameter with an 80-mil depth of field. Alternatively, a 5.0 inch *f*. 1. germanium lens can be used to focus the beam down to about 20 mils diameter with a depth of field of about 330 mils.

In practicing the novel method, a cathode-ray tube 21 is placed in the holder 37 and clamped as shown in FIG. 1, and the laser apparatus is made to generate a radiant-energy beam which punctures a hole in the envelope wall of the neck portion. The beam is then turned off and the tube 21 is removed from the holder. When a hole is punctured through the glass neck wall, the ambient gas, which may be air or some controlled atmosphere, flows through the puncture and fills the tube 21. Subsequently, a portion of the neck 27 including the puncture and the mount assembly is cut off and discarded. There are two important features about the novel method over the prior art.

Figure 2:
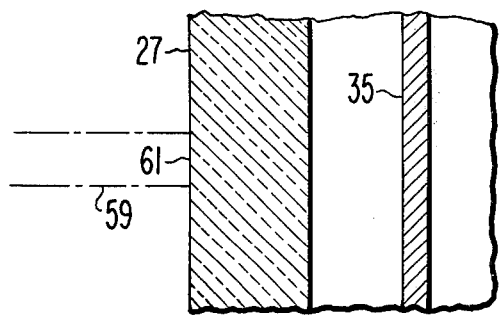
FIGS. 2 to 4 are enlarged fragmentary, sectional, elevational views of the envelope of the tube of FIG. 1 at various stages of producing a hole therein with a laser beam.
Figure 3:
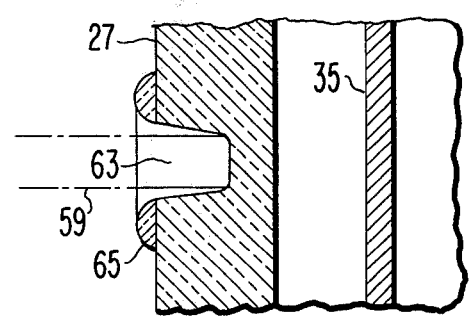
Figure 4:
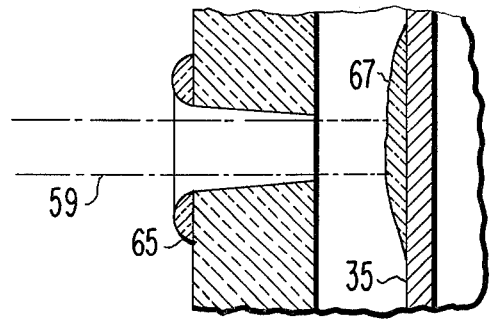

By the first feature, the beam is incident upon a neck wall portion that is opposite and closely spaced from an internal surface structure 35 comprising the mount assembly. Initially, the beam is incident upon an area 61 of the outer neck wall surface as shown in FIG. 2. As radiant beam energy is absorbed by the glass neck wall, the energy is converted to heat which volatilizes some of the glass material and forms a crater 63 as shown in FIG. 3. The crater 63 includes a wall 65 of glass material that extends above the outer glass surface of the neck portion 27. In the last stage, glass material at the bottom of the crater 63 is volatilized and is carried into the tube with the inward rush of gas due to the pressure differential between the inside and outside of the tube 21. Volatilized material condenses on and sticks to the internal surface structure 35 as a vitreous layer 67, as shown in FIG. 4. By forming the vitreous layer 67, fewer particles are formed and fewer particles reach the funnel portion of the tube, which is to be salvaged. The vitreous layer 67 is subsequently discarded with the cut-off neck portion and mount assembly. Most of the volatilized material is formed into the layer 67 when the surface is at least 250 mils in its smallest dimension and which is no further than 250 mils from the inner surface of the neck portion.

By the second feature, the beam pulses carry a lower energy than the prior methods for puncturing of the glass neck wall. This is preferably about 1.2 to 2.2 joules per pulse, or less than 50 percent of the energy per pulse employed by the method disclosed in the above-cited *RCA Engineer* article. For a glass wall thickness of about 90 mils, 40 to 50 pulses applied in about 30 seconds are adequate to puncture the wall.

This lower energy per pulse and lower rate of energy input produce substantially no fracturing of the glass adjacent the puncture. This lower rate of energy input can be used for different glass wall thicknesses. Greater wall thicknesses require longer exposure times. With such rate of energy input, it is believed that each pulse volatilizes a portion of the glass wall, and that the final pulse punctures the glass wall as in the prior method. However, a lesser amount of volatilized glass material is swept into the tube than by the prior method disclosed in the above-cited *RCA Engineer* article. The lesser amount of volatilized material is believed to produce fewer particles. Furthermore, it is believed that most of the volatilized material adheres to the closely-spaced surface against which it is swept.

Where the pulsed beam carries a substantially lower energy concentration, the rate of advance of the hole is too slow to be practical. Where the pulsed beams carry a substantially higher energy concentration, the glass adjacent the puncture exhibits excessive fracturing into loose glass fragments and an excessive amount of volatilized glass is swept into the tube. The energy concentration is preferably maintained between about 1.2 to 2.2 joules per pulse. For a glass wall about 90 mils thick, about 48 pulses of 1.5 joule energy are required to puncture the wall in about 30 seconds.

I claim:

1. In a method for devacuating an evacuated electron tube to atmospheric pressure, said tube comprising an envelope having a glass neck portion and, housed in said neck portion, a mount assembly including a surface structure opposite and closely spaced from an area of said neck portion, said method including the step of directing a pulsed beam of radiant energy incident upon an external surface area of said glass neck portion until a crater is formed in said neck portion and the glass material at the bottom of said crater volatilizes and is swept into said envelope and condenses therein; the improvement comprising applying said beam to an area of said neck portion that is opposite and closely spaced from said surface structure comprising said mount assembly so that volatilized material that is swept into said tube condenses on and sticks to said surface structure of said mount assembly, said surface structure being spaced no further than 250 mils from the inner surface of said glass neck portion.

* * * * *